(12) United States Patent
Maita et al.

(10) Patent No.: US 7,362,031 B2
(45) Date of Patent: Apr. 22, 2008

(54) ELECTRIC MOTOR

(75) Inventors: Shigehiro Maita, Kiryu (JP); Yoshichika Kawashima, Kiryu (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 10/570,549

(22) PCT Filed: Sep. 1, 2004

(86) PCT No.: PCT/JP2004/012652

§ 371 (c)(1),
(2), (4) Date: May 18, 2006

(87) PCT Pub. No.: WO2005/025032

PCT Pub. Date: Mar. 17, 2005

(65) Prior Publication Data

US 2007/0024148 A1    Feb. 1, 2007

(30) Foreign Application Priority Data

Sep. 3, 2003    (JP)    ............................. 2003-311289
Sep. 3, 2003    (JP)    ............................. 2003-311290

(51) Int. Cl.
*H02K 1/00*    (2006.01)
*H02K 1/22*    (2006.01)
(52) U.S. Cl. ........................ 310/261; 310/216; 310/180
(58) Field of Classification Search ................ 310/198, 310/269, 40 MM, 180, 216
See application file for complete search history.

(56) References Cited

U.S. PATENT DOCUMENTS

| | | | | |
|---|---|---|---|---|
| 2,660,681 A | * | 11/1953 | Horne | .......................... 310/198 |
| 4,262,853 A | * | 4/1981 | Dammar | .................. 242/433.3 |
| 4,514,654 A | * | 4/1985 | Muller | ........................ 310/216 |
| 4,520,965 A | * | 6/1985 | Kimura et al. | ........... 242/433.3 |
| 5,191,250 A | * | 3/1993 | Kobayashi | .................. 310/261 |
| 6,376,963 B1 | * | 4/2002 | Furuya et al. | .............. 310/269 |
| 6,568,066 B2 | * | 5/2003 | Furuya et al. | ................. 29/598 |
| 2001/0038253 A1 | * | 11/2001 | Furuya et al. | .............. 310/269 |

FOREIGN PATENT DOCUMENTS

| | | | |
|---|---|---|---|
| JP | 62138051 A | * | 6/1987 |
| JP | 04-255438 | | 9/1992 |
| JP | 05219701 A | * | 8/1993 |
| JP | 06-225490 | | 8/1994 |
| JP | 2001-298917 | | 10/2001 |

(Continued)

*Primary Examiner*—Darren Schuberg
*Assistant Examiner*—Naishadh N Desai
(74) *Attorney, Agent, or Firm*—McCormick, Paulding & Huber LLP

(57) ABSTRACT

An electric motor has an armature rotatably accommodated inside a motor housing and a pair of magnets fixed to an inner surface of the motor housing so as to face the armature. The armature has an armature core 17 fixed to a rotating shaft 16, and ten slots S1 to S10 formed on the armature core accommodate coils. These slots S1 to S10 are of four types that are different in shape, thereby enhancing a lamination factor of each coil. Also, these slots S1 to S10 are formed so as to be tilted in a rotating direction with respect to an axial direction of the rotating shaft 16. Therefore, a magnetic imbalance caused by the slots S1 to S10 being formed in varying shapes is uniformized.

16 Claims, 6 Drawing Sheets

FOREIGN PATENT DOCUMENTS

| | | | |
|---|---|---|---|
| JP | 2001298917 A | * | 10/2001 |
| JP | 2002-291210 | | 10/2002 |
| JP | 2002291210 A | * | 10/2002 |
| JP | 2003047184 A | * | 2/2003 |
| JP | 2003289637 A | * | 10/2003 |
| JP | 2003319578 A | * | 11/2003 |

* cited by examiner

FIG. 2
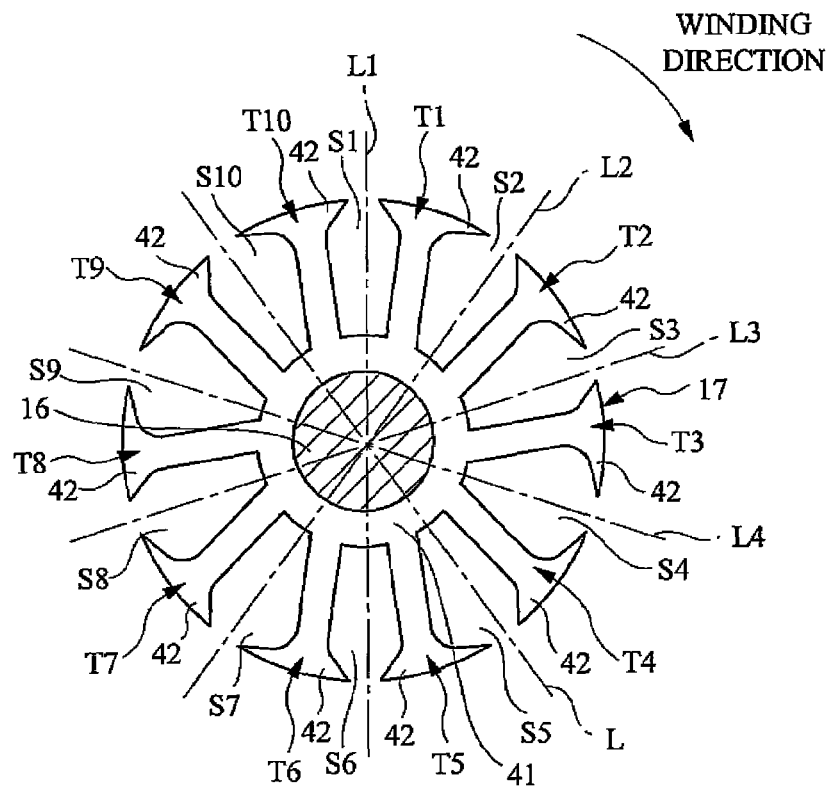
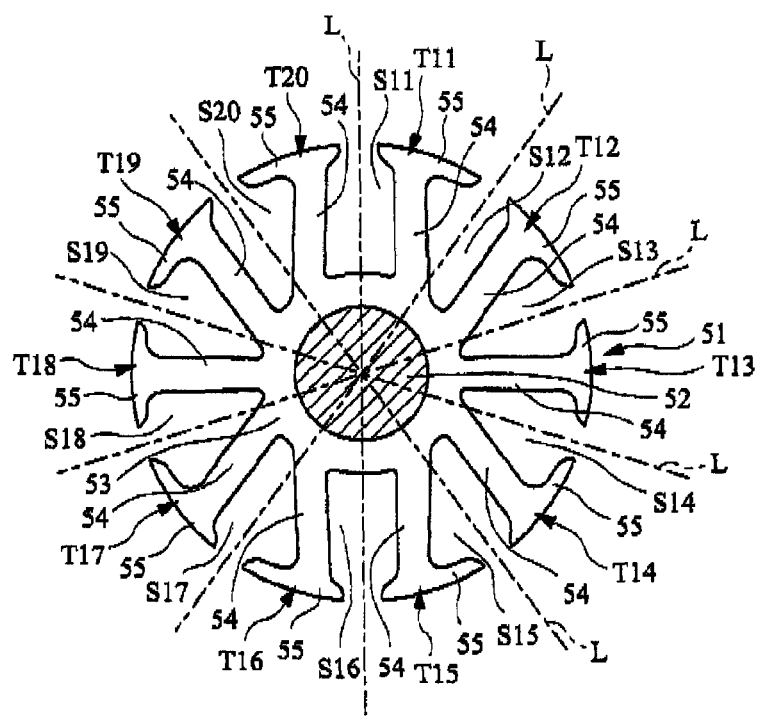
FIG. 4

ELECTRIC MOTOR

CROSS-REFERENCE TO RELATED APPLICATIONS

This application is entitled to the benefit of and incorporates by reference essential subject matter disclosed in International Patent Application No. PCT/JP2004/012652 filed on Sep. 1, 2004, Japanese Patent Application No. 2003-311289 filed on Sep. 3, 2003, and Japanese Patent Application No. 2003-311290 filed on Sep. 3, 2003.

TECHNICAL FIELD

The present invention relates to an electric motor that converts electric energy to mechanical energy via magnetic energy and, more particularly, to an electric motor equipped with an armature core around which coils are wound in a manner of a lap winding.

BACKGROUND ART

An electric motor has an armature rotatably accommodated inside a motor housing and a pair of magnets fixed to an inner surface of the motor housing so as to face the armature, and converts a direct current, i.e., electric energy supplied to the armature, to rotation of the armature, i.e., mechanical energy, for output.

The armature for use in such an electric motor has a rotating shaft and an armature core fixed to the rotating shaft, and is rotatably supported at the rotating shaft in the motor housing. The armature core has a boss portion fixed to the rotating shaft and a plurality of teeth protruding from the boss portion in a radial direction. Among the teeth, slots extending in an axial direction of the rotating shaft are formed. Normally, the respective teeth are all formed into the same shape and are equally spaced apart in a circumferential direction. Thus, the respective slots are also formed into the same shape. Coils are wound around each of these slots and, by supplying a direct current to these coils, coils positioned in a magnetic field produces a magnetic force, thereby causing a rotary force to occur at the armature, that is, the rotating shaft.

As a scheme of winding the coils around the armature core, a so-called double flier scheme has been known in which a lap winding is performed simultaneously at two positions so as to satisfy a relation of point symmetry with respect to the rotating shaft. In this case, a coil is first wound between a pair of slots between which the predetermined number of the teeth is disposed, and such a manner is performed on both sides so as to satisfy a relation of the point symmetry with respect to the rotating shaft. This is further performed as being shifted in sequence to the adjacent slots in a predetermined winding direction.

In such a winding scheme, however, a crossover portion of the coil later wound, that is, a portion connected between the slots at an edge surface of the armature core, is superposed on the outside of a crossover portion of the coil previously wound. Therefore, the coil later wound is disposed on a position closer to an opening side in the slot. Also, winding of the coil is performed on both sides so as to satisfy a relation of point symmetry with respect to the rotating shaft. Therefore, a certain slot accommodates a first-wound coil and a second-wound coil, whilst another slot accommodates a last-wound coil and a second-last-wound coil. Thus, if all the slots are formed in the sane shape, a wasted space occurs in each slot, whereby a lamination factor of the coils to the slots decreases.

For this reason, for example, in an electric motor disclosed in Patent Document 1, each slot is formed so that a slot accommodating coils on a winding start side is wide in a circumferential direction on a bottom side and narrow on an opening side and a slot accommodating coils on a winding end side is narrow on the bottom side and wide on the opening side. Thereby, the wasted space occurring in each slot is reduced, whereby the lamination factor of the coils is enhanced. Thus, the armature core having slots of a plurality of types different in shape is also called an variant core, and has been widely known as a technique for increasing the number of coils to be wound and improving efficiency of the electric motor.

Patent Document 1: Japanese Patent Laid-Open Publication No. 4-255438 (pp. 3-4, FIGS. 2 to 7)

DISCLOSURE OF THE INVENTION

However, in the electric motor with such a variant core, an interval of the adjacent teeth is different between the respective teeth, which results in the fact that length of the crossover portion of each coil is varied per coil in each winding process. Thus, a magnetic balance between the armature core and magnets is varied in the rotating direction, and it is difficult to decrease fluctuations in a magnetic force and cogging torque caused by each coil and reduce torque ripple of the outputted torque.

An object of the present invention is to improve efficiency of an electric motor and reduce torque ripple.

An electric motor according to the present invention converts electric energy to mechanical energy via magnetic energy and comprises: a rotating shaft rotatably supported in a motor housing; an armature core provided with a boss portion fixed to the rotating shaft and a plurality of teeth each including a base portion protruding from the boss portion; magnets fixed to an inner surface of the motor housing so as to face an outer circumferential surface of the armature core; and a coil spreading across a pair of the teeth, between which a predetermined number of the teeth is spaced, and accommodated wound in slots, wherein the slots of at least two types different in shape formed among the teeth are provided, and are tilted in a rotating direction with respect to an axial direction of the rotating shaft.

The electric motor according to the present invention further comprises: a first slot accommodating two coils on a winding start side and a second slot accommodating two coils on a winding end side, wherein a circumferential-directional width on a bottom side of the first slot is formed to be larger than a circumferential-directional width on a bottom side of the second slot, and a circumferential-directional width on an opening side of the second slot is formed to be larger than a circumferential-directional width on an opening side of the first slot.

The electric motor according to the present invention is such that the teeth each have, at a tip portion, an engaging portion which extends from the tip portion in the circumferential direction and whose tip is at an acute angle.

According to the present invention, since the slots accommodating the coils are of at least two types different in shape and are tilted in the rotating direction with respect to the axial direction of the rotating shaft, a lamination factor of the coils wound around the slots can be enhanced and simultaneously a magnetic balance of the armature with respect to the magnets can be uniformized. Thus, the efficiency of the electric motor can be improved, and torque ripple can be reduced. Furthermore, the reduction in the torque ripple allows reductions in vibration and noise occurring at a time of operating the electric motor Furthermore, according to the present invention, the winding amount of coils reduced due to a tilt of the slots being tilted in the rotating direction with respect to the axial direction of the rotating shaft can be compensated for by varying the shapes of the slots. Thus, by increasing a tilt angle of each of the slots, torque ripple of the electric motor can be further reduced.

Still further, according to the present invention, since the tip of the engaging portion is formed at an acute angle, holding characteristic of the coils can be enhanced. Also, since reluctance between the adjacent engaging portions is reduced, it is possible to reduce leakage inductance and enhance rectification of the coils.

BRIEF DESCRIPTION OF THE DRAWINGS

FIG. 2 is a section view showing a shape in which an armature core shown in FIG. 1 is viewed from an axial direction;

FIG. 4 is a section view showing a modification example of the armature core shown in FIG. 2;

BEST MODE FOR CARRYING OUT THE INVENTION

Embodiments of the present inventions will be described in detail below based on the drawings.

Figure 1:
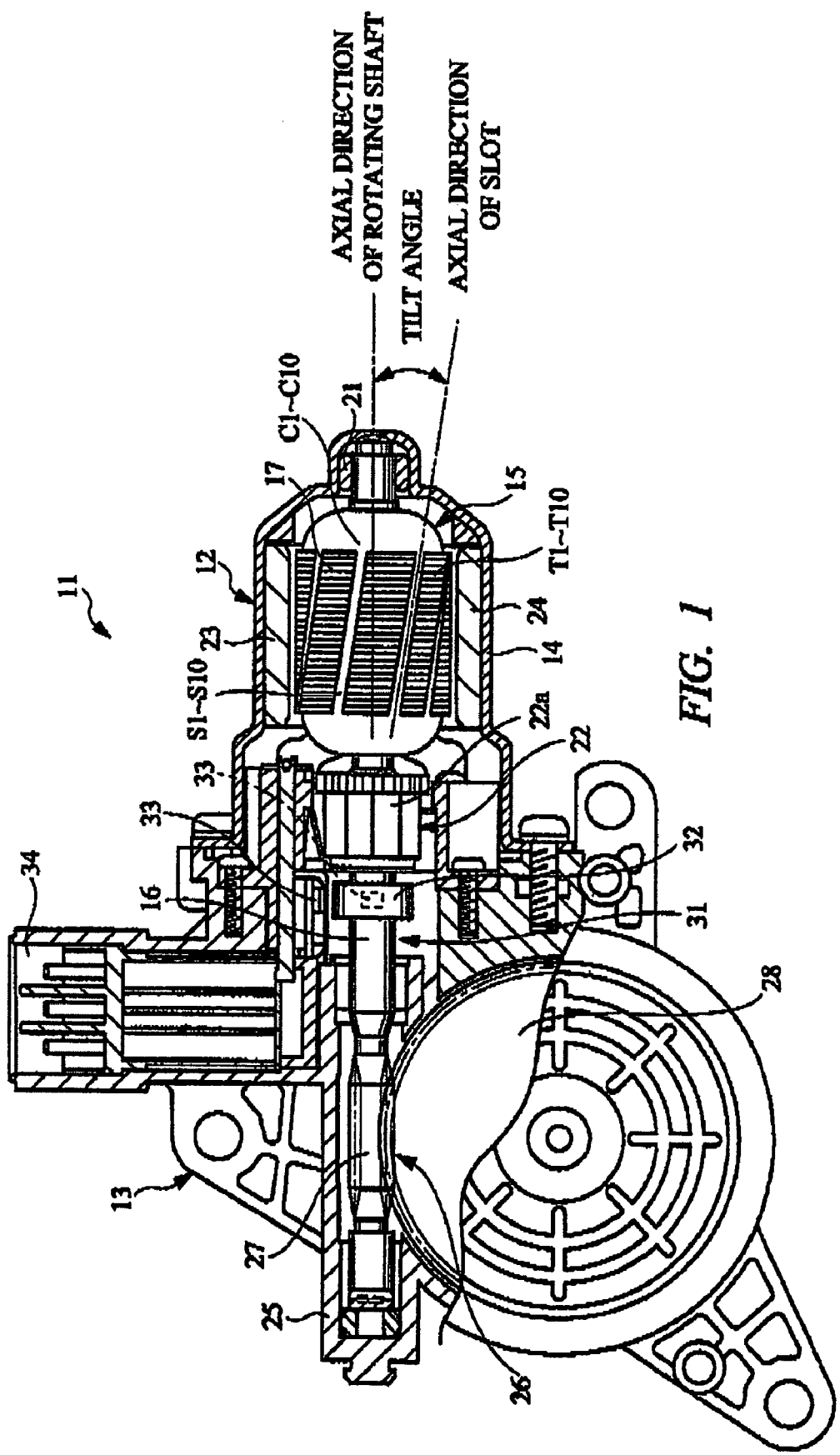
FIG. 1 is a partially cut section view of a regulator motor provided with an electric motor according to one embodiment of the present invention.
Figure 3A:
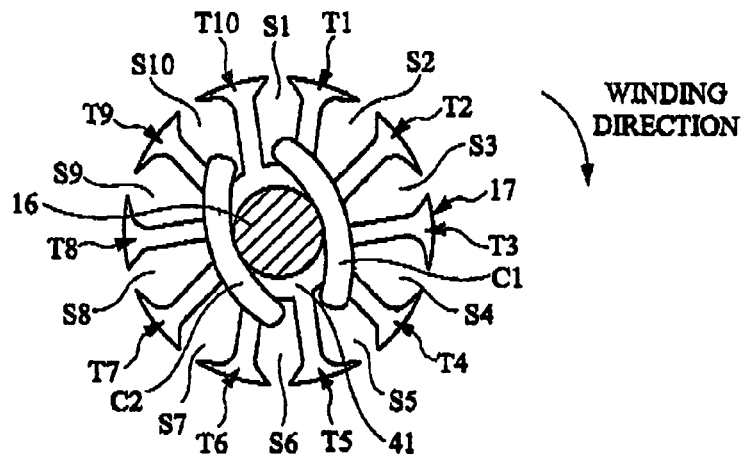
FIGS. 3A to 3C are section views showing a scheme of winding of coils around the armature core, respectively.
Figure 3B:
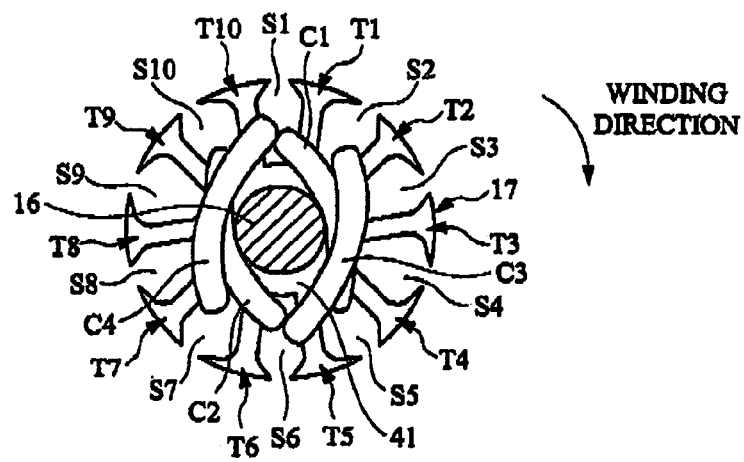
Figure 3C:
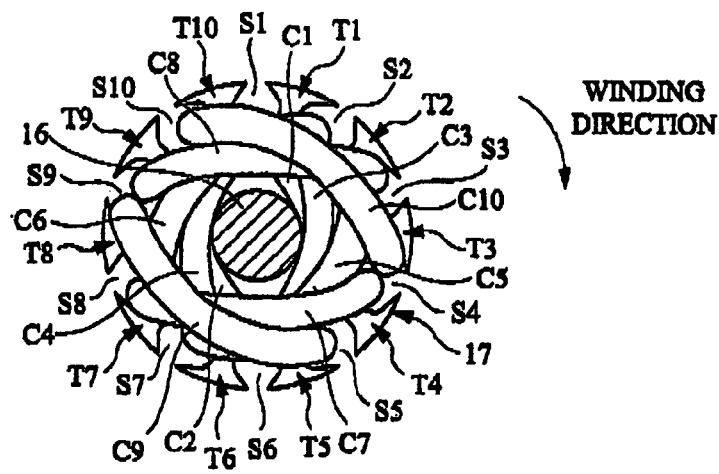

FIG. 1 is a partially cut section view of a regulator motor with an electric motor according to one embodiment of the present invention. FIG. 2 is a section view showing a shape in which an armature core shown in FIG. 1 is viewed from an axial direction. FIGS. 3A to 3C are section views showing a scheme of winding of coils around the armature core, respectively.

A regulator motor 11 shown in FIG. 1 is mounted on a door provided in an unshown vehicle for open/close driving of a door glass openably and closably provided to the door. In this case, the door glass is supported openably and closably in a vertical direction of the door via a guiding member, and is also connected to an unshown output shaft of the regulator motor 11 via a regulator. When the regulator motor 11 operates, rotational movement of the output shaft is converted by the regulator to vertical movement of the door glass for opening and closing operations.

As shown in FIG. 1, the regulator motor 11 has an electric motor 12 and a decelerator 13. The rotation of the electric motor 12 is decelerated by the decelerator 13 to the predetermined number of rotations, and is then outputted from the output shaft.

The electric motor 12 has a motor housing 14 formed so as to have an oval in section. This motor housing 14 has an armature 15 accommodated therein. The armature 15 has a rotating shaft 16, which is also called an armature shaft, and an armature core 17, which is also called an iron core. The rotating shaft 16 is rotatably supported in the motor housing 14 via a bearing 21. This allows the armature 15 to be freely rotate inside the motor housing 14.

The armature core 17 is formed by laminating a plurality of punched plates formed into a predetermined shape, and its axial center is fixed to the rotating shaft 16 and is rotated integrally with the rotating shaft 16. Also, the armature core 17 has ten slots S1 to S10 formed thereon, and the slots S1 to S10 have coils C1 to C10 accommodated therein.

The axial direction of each of the slots S1 to S10 is tilted in a so-called skewed manner so that the punched plates are laminated so as to be sequentially shifted by a predetermined angle and tilted, with respect to the axial direction of the rotating shaft 16, by a predetermined angle in a rotational direction of the rotating shaft 16. Note that this armature core 17 and the coils C1 to C10 are described in detail further below.

The rotating shaft 16 has a commutator 22 fixed thereto, and this commutator 22 is provided with ten commutator pieces 22a insulated from one another and radially disposed. Each of the coils C1 to C10 is connected at its end to a corresponding commutator piece 22a. Also, a pair of brushes not shown contact slidably with these commutator pieces 22a. The commutator 22 rectifies a direct current supplied to these brushes and supplies it to each of the coils C1 to C10. That is, this electric motor is a motor equipped with brushes.

Two magnets 23 and 24 disposed so as to face mutually different magnetic poles are fixed to an inner surface of the motor housing 14. By these magnets 23 and 24, a magnetic field is formed inside the motor housing 14. These magnets 23 and 24 each face an outer circumferential surface of the armature core 17 via a predetermined gap (air gap). That is, the armature core 17 and the coils C1 to C10 are positioned inside the magnetic field formed by the magnets 23 and 24. Due to this, when the direct current rectified by the commutator 22 is supplied to the coils C1 to C10, an electromagnetic force is produced at the coils C1 to C10 positioned in the magnetic field, thereby causing a rotary force at the armature 15. That is, this electric motor 12 converts the direct current, namely, electric energy supplied via the brushes to the coils C1 to C10, to the rotation of the armature 15, namely, mechanical energy via magnetic energy of the magnets 23 and 24 and an electromagnetic force produced by the coils C1 to C10.

On the other hand, the decelerator 13 has a structure in which a gear case 25 fixed to the motor housing 14 accommodates therein a decelerating mechanism 26. In this case, as the decelerating mechanism 26, a worm gear mechanism is used. The rotating shaft 16 of the electric motor 12 protrudes from an interior of the motor housing 14 to an interior of the gear case 25. A worm 27 configuring the decelerating mechanism 26 is formed integrally with an outer circumferential surface of a portion of the rotating shaft 16 protruding into the gear case 25. Also, the above-stated unshown output shaft is rotatably supported at the gear case 25. To the output shaft, a worm wheel 28 engaging with the worm 27 is fixed. Therefore, the rotation of the electric motor 12, i.e., the rotating shaft 16 is transferred as being decelerated via the worm 27 and the worm wheel 28 to the output shaft.

Also, a rotation sensor 31 is provided inside the gear case 25 so as to detect a rotational speed and a rotational direction of the rotating shaft 16. This rotation sensor 31 has an annular-shaped sensor magnet 32 having a plurality of magnetic poles aligned in a circumferential direction, and two magnetic sensors 33. The sensor magnet 32 is fitted in the rotating shaft 16 so as to rotate integrally with the rotating shaft 16. Furthermore, each magnetometric sensor 33 is disposed so as to face the sensor magnet 32 with a phase difference of 90 degrees in the circumferential direction by regarding the rotating shaft 16 as a center, and outputs a pulse signal, which is a detection signal, in accordance with a change of the magnetic poles due to the rotation of the sensor magnet 32. Note that, in this case, as the magnetic sensors 33, Hall elements are used.

The gear case 25 is provided with a coupler 34 and, via this coupler 34, each brush and the magnetic sensors 33 are connected to an unshown control device. As the control device, a so-called microcomputer including a CPU, a memory, and other components is used. In accordance with an operation of a power window switch or the like not shown, the direct current from a vehicle-mounted power supply is supplied to the brushes. Also, the control device detects the rotational speed of the rotating shaft 16 from the cycle of the pulse signal inputted from the magnetic sensors 33, and also detects the rotational direction of the rotating shaft 16 from order of appearance of pulse signals outputted from each of the magnetic sensors 33. Based on these detection results, the operation of the electric motor 12 is controlled. By doing so, when the power window switch is operated in an opening direction, for example, the operation of the electric motor 12 is controlled by the control device in a direction of opening the door glass. The rotation of the rotating shaft 16 is transferred from the output shaft via the regulator to the door glass, thereby causing the door glass to operate for opening. By contrast, when the power window switch is operated in a closing direction, the operation of the electric motor 12 is controlled in a direction of closing the door glass, thereby causing the door glass to operate for closing.

As shown in FIG. 2, the armature core 17 for use in this electric motor 12 is provided with a cylinder-shaped boss portion 41 fixed to the rotating shaft 16 and ten teeth T1 to T1 protruding from the boss portion 41. The above-described slots S1 to S10 are each formed between adjacent ones of the teeth T1 to T10.

The teeth T1 to T10 each have at its tip portion an engaging portion 42 (for example, a first engaging portion on a counterclockwise side and a second engaging portion on a clockwise side) which extends from the tip portion in the circumferential direction and whose tip is formed at an acute angle, and the engaging portion 42 is formed in an approximately T shape as a whole. Also, the teeth T1, T2, and T3 (first teeth group), and the teeth T6, T7, and T8 (fourth teeth group) are tilted in a counterclockwise direction in FIG. 2 with respect to a radial direction, whilst the teeth T4 and T5 (second teeth group) and the teeth T9 and T10 (third teeth group) are tilted in a clockwise direction in FIG. 2 with respect to the radial direction. Furthermore, the engaging portions 42 of the teeth T1 to T10 have the same width in the circumferential direction and are equally spaced apart in the circumferential direction. Thus, the slots S1 to S10 formed on the armature core 17 are of four types that are different in shape. Each shape of the slots S1 to S10 will be described below.

The slot S1 is formed between the teeth T1 and T10, and is symmetric in the circumferential direction with respect to a slot position reference line L set as a reference and indicated by a one-dot-chain line in the drawing, the line which connects a circumferential-directional intermediate position of an opening portion between the adjacent engaging portions 42 to the rotating shaft 16. Also, the slot S1 is formed so that the width on a side of the boss portion 41, i.e., on a bottom side and the width on a radial-directional outer side, i.e., on the opening side are approximately equal in the circumferential direction. Furthermore, the slot S6, which is located at a position of 180-degrees point symmetry of the slot S1 with respect to the rotating shaft 16, is also formed between the teeth T5 and T6 in a shape similar to the slot S1.

On the other hand, as for the slots S2 and S10 formed on both sides of the slot S1, a portion that is opposite to the slot S1 with reference to the slot position reference line L set as a reference is formed in a shape approximately identical to that of the slot S1, whilst a portion that is on a side of the slot S1 with respect to the slot position reference line L is formed so that the width in the circumferential direction on the bottom side is narrower than that of the slot S1 and the width in the circumferential direction on the opening side is wider than that of the slot S1. That is, the slots S2 and S10 are each formed so that the width in the circumferential direction on the bottom side is narrower than those of the slots S1 and S6 and the width in the circumferential direction on the opening side is wider than those of the slots S1 and S6. Therefore, as a whole, the slots S2 and S10 lean to a side of the slot S1. Furthermore, the slot S5 formed adjacently to the slot S6 is formed in a shape identical to that of the slot S10, and the slot S7 formed adjacently to the slot S6 is formed in a shape identical to that of the slot S2. Still further, the slot S3 adjacent to the slot S2 and opposite to the slot S1 and the slot S8 adjacent to the slot S7 and opposite to the slot S6 are formed in a shape approximately identical to those of the slots S2 and S7, respectively.

Next, the slot S4 formed between the slots S3 and S5 is formed so as to be approximately symmetric to the slot position reference line L set a reference in the circumferential direction and so that the width in the circumferential direction on the bottom side is further narrower than those of the slots S2, S3, S5, S7, S8, and S10 and the width in the circumferential direction on the opening side is further wider than those of the slots S2, S3, S5, S7, S8, and S10. Also, the slot S9, which is formed between the teeth T8 and T9 and is located at a position that is a 180-degrees point symmetry of the slot S4 with respect to the rotating shaft, is also formed in a shape similar to that of the slot S4. As such, this armature core 17 is a so-called variant core having the slots S1 to S10 of four types different in shape.

Next, a scheme of winding the coils C1 to C10 around the armature core 17 will be described based on FIGS. 3A to 3C.

Winding of the coils C1 to C10 around the armature core 17 is performed through a so-called double flier scheme in which a lap winding is performed simultaneously at two positions so as to satisfy a relation of point symmetry with respect to the rotating shaft 16. That is, a coil is first spread and wound around a pair of teeth between which four teeth are disposed, and is wound on both sides that satisfy a relation of point symmetry with respect to the rotating shaft 16. Then, winding is further performed as being shifted in sequence to the adjacent slots in a predetermined winding direction. In this case, in FIGS. 3A to 3C, the winding direction is a clockwise direction.

As shown in FIG. 3A, firstly, the coils C1 and C2 are wound between the teeth T1 and T4 and between T6 and T9, respectively, on both sides on which the rotating shaft 16 is sandwiched therebetween. The coil C1 spread across the teeth T1 and T4 is accommodated in the slots S1 and S5, whilst the coil C2 spread across the teeth T6 and T9 is accommodated in the slots S6 and S10. At this time, the coils C1 and C2 are accommodated on the bottom side of the slots S1 and S5 and the slots S6 and S10, respectively. After winding, these coils C1 and C2 are each connected at its end to the corresponding commutator piece 22a of the commutator 22.

Next, as shown in FIG. 3B, second coils C3 and C4 are spread across the teeth T2 and T5 and across the teeth T7 and T10, respectively. The coil C3 is accommodated in the slots S2 and S6, whilst the coil C4 is accommodated in the slots S7 and S1. At this time, each crossover portion of the coils C3 and C4, which is connected between the slots, is superposed outside each crossover portion of the first-wound coils C1 and C2. Therefore, the coils C3 and C4 are accommodated in the slots S2 and S7, respectively, so as to be slightly shifted to the opening side from the bottom side and are accommodated in the slots S6 and S1, respectively, so as to be adjacent to the first coils C1 and C2 and be accommodated on the opening side with respect to the coil C1 and C2. After winding, these coils C3 and C4 are also each connected at its end to the corresponding commutator piece 22a of the commutator 22.

Then, the coils C5 and C6, and the coils C7 and C8 are sequentially wound so as to be shifted in the winding direction in a manner similar to that described above. After fifth coils, i.e., last coils C9 and C10 are wound, a state is as shown in FIG. 3C. Note that these coils C1 to C10 are each formed by winding an electrically-insulated wire more than once, the wire having its external surface being coated with enamel or the like. In the drawings, for the purpose of convenience, each coil is shown as having a shape of a bundle of wires.

By winding the coils C1 to C10 around the armature core 17 through the double flier scheme, as shown in FIG. 3C, the crossover portions of the last coils C9 and C10 are superposed on the outmost side and therefore is accommodated on the opening side of the slots S5 and S9 and the slots S4 and S10, respectively. Also, the second-last coils C7 and C8 are accommodated on the opening side of the slots S4 and S8 and the slots S3 and S9, respectively. Therefore, in the slots S4 and S9 as the second slots, two coils C9 and C10 on the winding end side are accumulated on the opening side. On the other hand, as shown in FIG. 3A, the first-wound coils C1 and C2 are accommodated on the bottom side of the slots S1 and S5 and on the bottom side of the slots S6 and S10, respectively, and, as shown in FIG. 3B, the second-wound coils C3 and C4 are also accommodated on the bottom side of the slots S2 and S6 and on the bottom side of the slots S7 and S1, respectively. Accordingly, in the slots S1 and S6 as first slots, two coils C1 and C2 on the winding start side are accumulated on the bottom side.

However, in the armature core 17 for use in this electric motor 12, the widths of the slots S4 and S9 in the circumferential direction on the opening side where the coils C9 and C10 are accumulated are set to be wide, and the widths of the slots S1 and S6 in the circumferential direction on the bottom side where the coils C1 and C2 are accumulated are also set to be wide. Therefore, accommodation spaces for the coils C1 and C2 in the slots S1 and S6 and accommodation spaces for the coils C9 and C10 in the slots S4 and S9 are substantially expanded. That is, the slots S1 and S6 accommodating the coils C1 and C2 on the winding start side are each formed so that the width in the circumferential direction is wide on the bottom side and is narrow on the opening side. Accordingly, the slots S4 and S9 accommodating the coils C9 and C10 on the winding end side are each formed so that the width in the circumferential direction is narrow on the bottom side and is narrow on the opening side. Due to this, wasted spaces occurring in the slots S1, S4, S6, and S9 are reduced. Thus, the coils C1, C2, C9, and C10 can be efficiently accommodated. Also, the slots S2 and S3 and the slots S7 and S8 accommodating the coils C3 to C8 that are to be wound in the middle of the winding process are formed into an intermediate shape of the slots S1 and S6 and into an intermediate shape of the slots S4 and S9, respectively. Therefore, each of the coils C3 to C8 can be efficiently accommodated. Thus, in this armature core 17, a lamination factor of the coils C1 to C10 wound around the slots S1 to S10, i.e., a ratio of occupancy of the winding amount of coils to the accommodation space of the slots, can be increased, thereby increasing the winding amount of the coils C1 to C10 wound around the slots S1 to S10 to improve the efficiency of the electric motor 12.

Thus, in the electric motor 12, since the armature core 17 has the slots S1 to S10 of four types different in shape, it is possible to increase the lamination factor of the coils C1 to C10 to improve the efficiency of the electric motor 12.

Also, since the slots S3, S4, S5, S8, S9, and S10 accommodating the coils C9 and C10 on the winding end side are formed so that the width in the circumferential direction is wide on the opening side, the first engaging portion 42 of each of the teeth T2, T3, T7 and T8 is longer than the second engaging portion 42 thereof and the second engaging portion 42 of each of the teeth T4, T5, T9, and T10 is longer than the first engaging portion thereof on a side where the coils C9 and C10 are spread. Therefore, engagement of the coils C9 and C10 with the teeth T2, T3, T4, T5, T7, T8, T9, and T10 is ensured, whereby holding characteristics of the coils C9 and C10 are enhanced.

Furthermore, in the electric motor 12, the engaging portion 42 of each of the teeth T1 to T10 has a tip formed at an acute angle. Therefore, at the time of winding, the coil can easily fall and be inserted into the relevant one of the slots S1 to S10, thereby making it possible to easily wind the coils C1 to C10. Also, since the tip is formed at an acute angle, the coils wound around the slots S1 to S10 can be reliably caught on the engaging portion 42. In particular, the holding characteristics of the last coil C9 by the teeth T5 and T8 and the holding characteristics of the last coil C10 by the teeth T3 and T10 can be enhanced.

As such, in the electric motor 12, since the tip of the engaging portion 42 is formed at an acute angle, winding the coils C1 to C10 around the slots S1 to S10 can be easily performed. Also, the holding characteristics of the coils C1 to C10 by the teeth T1 to T10 can be enhanced.

Furthermore, since each engaging portion 42 is formed at an acute angle, a facing area between the adjacent engaging portions 42 is small, whereby reluctance between these engaging portions 42 is reduced. Thus, leakage inductance occurring between the engaging portions 42 at the time of feeding power to the coils C1 to C10 is reduced, whereby rectification of the coils C1 to C10 can be enhanced.

As such, in the electric motor 12, since the tip of the engaging portion 42 is formed at an acute angle, the leakage inductance between the adjacent engaging portions 42 can be reduced, so that the rectification of the coils C1 to C10 can be enhanced.

Incidentally, in the armature core 17, since the teeth T1 to T10 are differently spaced apart in the circumferential direction, lengths of the crossover portions of the coils C1 to C10, i.e., coil lengths, are different from one another. Therefore, a magnetic balance between the armature 15 and the magnets 23 and 24 is varied in a rotating direction. However, in the electric motor 12, the slots S1 to S10 are formed so as to have four types different in shape and, as seen from FIG. 1, the slots S1 to S10 are skewed so as to extend as being tilted in the rotating direction with respect to the axial direction of the rotating shaft 16. Therefore, a magnetic imbalance caused by the teeth T1 to T10 and the coils C1 to C10 is uniformized to be reduced. That is, since fluctuations in cogging torque occurring due to the respective teeth T1 to T10 being differently spaced apart in the circumferential direction and differences in electromagnetic force among the coils C1 to C10 occurring due to the coil lengths differently wound around the respective coils C1 to C10, i.e., fluctuations in output torque, are uniformized by skewing the slots S1 to S10. Thus, even if the slots S1 to S10 of four types different in shape are provided to the armature core 17, torque ripple occurring at the output torque of the electric motor 12 can be reduced.

Furthermore, in the armature core in which all the slots are formed in the same shape, if the slots are tilted in the rotating direction with respect to the axial direction of the rotating shaft 16, a projection area of each slot is reduced. Therefore, the winding amount of coils that can be accommodated in these slots is reduced, thereby decreasing the efficiency of the electric motor. In the electric motor 12, however, even if the slots S1 to S10 are tilted in the rotating direction with respect to the axial direction of the rotating shaft 16, the winding amount of coils reduced due to a decrease in the projection area of the slots S1 to S10 can be compensated for by varying the shapes of the slots S1 to S10.

As such, in the electric motor 12, the slots S1 to S10 of four types different in shape are formed on the armature core 17, and each of the slots S1 to S10 is tilted in the rotating direction with respect to the axial direction of the rotating shaft 16. Therefore, an interaction between the variant core and the skew allows the efficiency of the electric motor 12 to be improved and torque ripple to be reduced. Also, the reduction in torque ripple allows reduction in vibration and noise at the time of operating the electric motor 12. Furthermore, without decreasing the lamination factor of the coils C1 to C10, since the tilt angle of the slots S1 to S10 with respect to the rotating direction of the rotating shaft 16 can be increased, the torque ripple of the electric motor 12 can be further reduced.

Still further, if this electric motor 12 is used for the regulator motor 11 for opening and closing the door glass of the vehicle, the door glass can be smoothly operated. Also, by downsizing the electric motor 12, its mountability on vehicles can be improved.

Figure 5A:
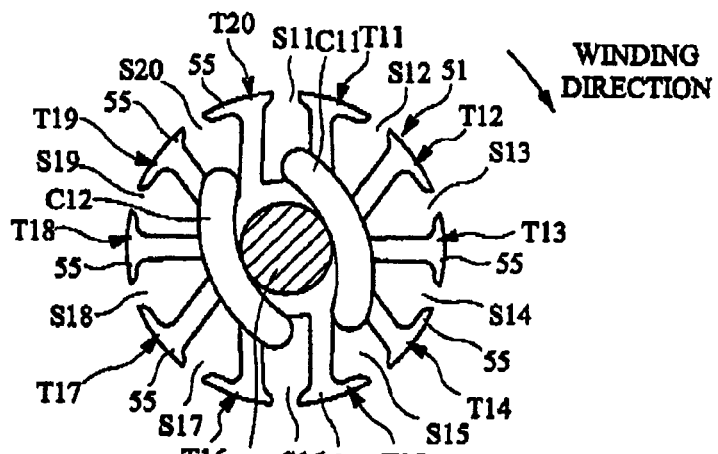
FIGS. 5A to 5C are section views showing a scheme of winding of coils around the armature core shown in FIG. 4, respectively.
Figure 5B:
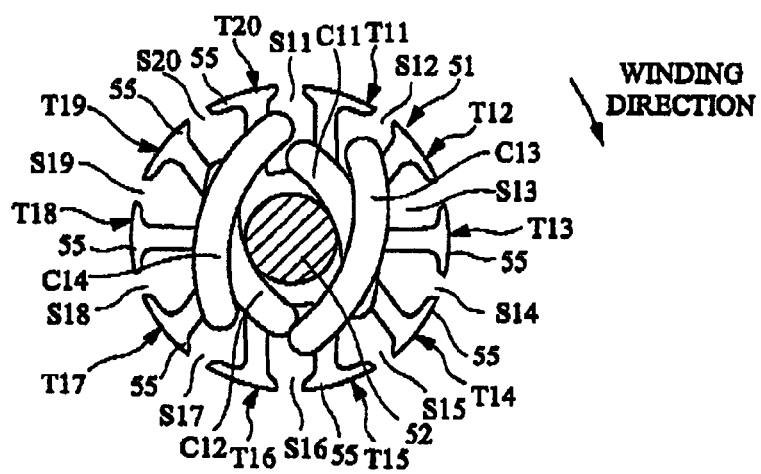
Figure 5C:
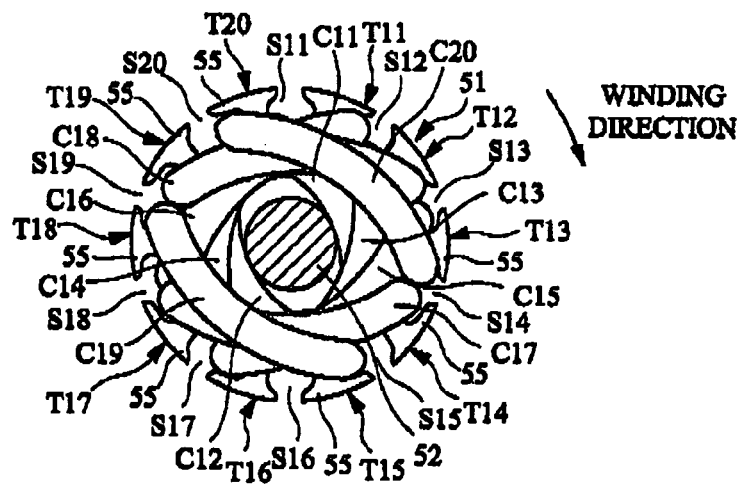

FIG. 4 is a section view showing a modification example of the armature core shown in FIG. 2. FIGS. 5A to 5C are each a section view showing a scheme of winding the coils around the armature core shown in FIG. 4.

An armature core 51 shown in FIG. 4 includes a cylindrical boss portion 53 fixed to a rotating shaft 52, and ten teeth T11 to T20 coupled to one another by the boss portion 53. The teeth T11 to T20 each includes a base portion 54 protruding from the boss portion 53 and an engaging portion 55 integrally formed at a tip of the base portion 54 and extending to both sides in a circumferential direction. Thus, each of the teeth T11 to T20 is formed in an approximately T shape. Also, the teeth T11 to T20 are formed so that each base portion 54 has approximately the same width in the circumferential direction and so that each engaging portion 55 has the same width in the circumferential direction. Furthermore, each engaging portion 55 is disposed in the circumferential direction in a state of having a predetermined gap between the adjacent engaging portions 55.

Between adjacent ones of the teeth T11 to T20, slots S11 to S20 similar to those as described above are formed as being partitioned by the base portions 54 and the engaging portions 55 of the adjacent ones of the teeth T11 to T20. These slots S11 to S20 are each opened between the adjacent engaging portions 55. The slots S11 to S20 have a plurality of types of shapes, that is, this armature core is a so-called variant core. Also, as with the armature core 17 shown in FIG. 2, the slots S11 to S20 are tilted in the rotating direction with respect to the axial direction of the rotating shaft 52.

The shapes of the slots S11 to S20 will be described below.

The slot S11 is formed between the teeth T11 and T20, and is symmetric in the circumferential direction with respect to a slot position reference line L set as a reference and indicated by a one-dot-chain line in the drawing, the line which connects a circumferential-directional intermediate position of an opening portion between the adjacent engaging portions 55 to a shaft center of the rotating shaft 52. Also, the slot S11 is formed so that a circumferential-directional width on a side of the boss portion 53, i.e., on the bottom side and a circumferential-directional width on an outer side, i.e., on the opening side are approximately equal. That is, the slot S11 is formed in an approximately rectangular shape.

Also, the slot S16, which is formed between the teeth T15 and T16, is formed in a shape identical to that of the slot S11. The slot S16 is positioned with respect to the slot position reference line L set as a reference, which is identical to that for the slot S11. That is, the slot S11 as a first slot and the slot S16 are disposed point-symmetrically by regarding the rotating shaft 52 as a center.

On both sides of the slot S11, a pair of slots S12 and S20 as second slots are disposed together with the slot S11 in line. These slots S12 and S20 are each formed so that a circumferential-directional width on a side of the slot S11 with respect to a corresponding slot position reference line L is narrower on the bottom side than the slot S11 and is wider on the opening side than the slot S11 and so that a circumferential-directional width on a side opposite to the slot S11 with respect to the slot position reference line L is approximately equal to the slot S11 on both of the bottom side and the opening side. That is, as a whole, the slots S12 and S20 are each formed so that the circumferential-directional width on the bottom side is narrower than the slot S11 and the circumferential-directional width on the opening side is wider than the slot S11, and, as a whole, are tilted on a side of the slot S11 with respect to the corresponding slot position reference line L set as a reference.

Similarly, also on both sides of the slots S16 disposed at positions of point symmetry that regards the rotating shaft 52 as a center with respect to the slot S11, a pair of slots S15 and S17 as second slots are disposed together with the slot S16 in line. The slot S15 is formed in a shape identical to that of the slot S20, and is disposed at a position of point symmetry that regards the rotating shaft 52 as a center with respect to the slot S20. The slot S17 is formed in a shape identical to that of the slot S12, and is disposed at a position of point symmetry that regards the rotating shaft 52 as a center with respect to the slot S12. That is, these slots S15 and S17 are each formed so that a circumferential-directional width on a side of the slot S16 with respect to the corresponding slot position reference line L is narrower on the bottom side than the slot S16 and is wider on the opening side than the slot S16 and so that a circumferential-directional width on a side opposite to the slot S16 with respect to the slot position reference line L is approximately equal to the slot S16 on both of the bottom side and the opening side. For this reason, as a whole, the slots S15 and S17 are each formed so that the circumferential-directional width on the bottom side is narrower than the slot S16 and the circumferential-directional width on the opening side is wider than the slot S16, and lean on a side of the slot S16 with reference to the corresponding slot position reference line L. As such, two pairs of slots, i.e., slots S11 and S16 and the slots S12 and S17, which are mutually formed into the same shape, are disposed in line on both sides of S16.

The slot S13 is disposed in line on an opposite side of the slot S11 with respect to the slot S12, and the slot S19 is disposed in line on an opposite side of the slot S11 with respect to the slot S20. Also, the slot S14 is disposed in line on an opposite side of the slot S16 with respect to the slot S15, and the slot S18 is disposed in line on an opposite side of the slot S16 with respect to the slot S17. These slots S13, S14, S18, and S19 are each formed so that a circumferential-directional width on the bottom side is further narrower than the slots S12, S15, S17, and S20 and a circumferential-directional width on the opening side is further wider than the slots S12, S15, S17, and S20, and are each formed so as to be symmetric with respect to a corresponding slot position reference line L set as a reference. That is, also in the slots S13, S14, S18, and S19, the circumferential-directional width on a side opposite to each of the slots S12, S15, S17, and S20 with respect to the relevant slot position reference line L is narrower than the slots S11 and S16 on the bottom side and is wider than the slots S11 and S16 on the opening side.

As such, by being configured from the slots S11 to S20 as described above, the armature core 51 is formed to have line symmetry in which the slot position reference line L of each of the slots S11 and S16 is set as a reference.

Next, a scheme of winding the coils C11 to C20 around the armature core 51 will be described based on FIGS. 5A to 5C.

Winding of the coils C11 to C20 around the armature core 51 is performed through a double lap winding, that is, a so-called double flier scheme, in which a lap winding is performed simultaneously at two positions so as to satisfy a relation of point symmetry with respect to the rotating shaft 52. In the double flier scheme, a coil is first spread across and wound around a pair of teeth that are four teeth away from each other, and this is performed on both sides where a relation of point symmetry is satisfied with respect to the rotating shaft 52. Then, the winding is further performed as being shifted in sequence to the adjacent slots in a predetermined winding direction. Note that in the case shown in FIGS. 5A to 5C, the winding direction is set to be a clockwise direction.

As shown in FIG. 5A, firstly, the coils C11 and C12 are wound between the teeth T11 and T14 and between T16 and T19 on both sides where the rotating shaft 52 is sandwiched therebetween. The coil C11 spread across the teeth T11 and T14 is accommodated in the slots S11 and S15, whilst the coil C12 spread across the teeth T16 and T19 is accommodated in the slots S16 and S20. At this time, the coils C11 and C12 are accommodated on the bottom sides of the slots S11 and S14 and on the bottom sides of the slots S16 and S20, respectively. After the winding, these coils C11 and C12 are each connected at its end to the corresponding commutator piece 22a of the commutator 22.

Next, as shown in FIG. 5B, the second coil C13 is spread across the teeth T12 and T15, and the coil C14 is spread across the teeth T17 and T20. The coil C13 is accommodated in the slots S12 and S16, whilst the coil C14 is accommodated in the slots S17 and S11. At this time, a crossover portion of each of the coils C13 and C14 that connects the slots is superposed outside the crossover portion of each of the first-wound coils C11 and C12, respectively. Therefore, the coils C13 and C14 are accommodated in the slots S12 and S17, respectively, so as to be slightly shifted to the opening side from the bottom side and are accommodated in the slots S16 and S11 so as to be adjacent to the first coils C11 and C12 and be on the opening side with respect to the coil C11 and C12, respectively. After the winding, these coils C13 and C14 are also each connected at its end to the corresponding commutator piece 22a of the commutator 22.

Then, the coils C15 and C16 and the coils C17 and C18 are wound so as to be sequentially shifted in the winding direction in a manner similar to that described above. After the last coils, i.e., the fifth coils C19 and C20 are wound, the state is as shown in FIG. 5C. Note that these coils C11 to C20 are each formed by winding an electrically-insulated wire more than once, the wire having its external surface being coated with enamel or the like. In the drawings, for the purpose of convenience, each coil is shown as having a shape of a bundle of wires.

When the coils C11 to C20 are wound around the armature core 51 through the double flier scheme, as shown in FIG. 5C, a crossover portion of each of the last coils C19 and C20 is superposed on the outermost side and therefore is accommodated on the opening sides of the slots S15 and S19 and the slots S14 and S20, respectively. Also, the second-last coils C17 and C18 are accommodated on the opening side of the slots S14 and S18 and the slots S13 and S19, respectively. Therefore, two coils C19 and C20 on the winding end side, which are accommodated in the slots S14 and S19 as the second slots, are accumulated on the opening side. On the other hand, as shown in FIG. 5A, the first-wound coils C11 and C12 are accommodated on the bottom sides of the slots S11 and S15 and the slots S16 and S20, respectively, and, as shown in FIG. 5B, the second-wound coils C13 and C14 are also accommodated on the bottom sides of the slots S12 and S16 and the slots S17 and S11, respectively. Accordingly, two coils C11 and C12 on the winding start side, which are accommodated in the slot S11 and S16 as first slots, are accumulated on the bottom side.

However, in the armature core 51, the circumferential-directional widths of the slots S14 and S19 on the opening side where the coils C19 and C20 are accumulated are set to be wide, and the circumferential-directional widths of the slots S11 and S16 on the bottom side where the coils C11 and C12 are accumulated are also set to be wide. Therefore, an accommodation space for the coils C11 and C12 into the slots S11 and S16 and an accommodation space for the coils C19 and C20 into the slots S14 and S19 are substantially expanded. That is, the slots S11 and S16 accommodating the coils C11 and C12 on the winding start side are each formed so that the width in the circumferential direction is large on the bottom side and is narrow on the opening side. Accordingly, the slots S14 and S19 accommodating the coils C19 and C20 on the winding end side are each formed so that the width in the circumferential direction is narrow on the bottom side and is large on the opening side. Due to this, the wasted spaces occurring in the slots S11, S14, S16, and S19 are reduced. Thus, the coils C11, C12, C19, and C20 can be efficiently accommodated. Also, the slot S13 accommodating the coils C15 and C18 and the slot S18 accommodating the coils C16 and C17 are formed in a shape similar to those of the slots S14 and S19 so that the width on the opening side is large. The slot S12 accommodating the coils C13 and C16, the slot S17 accommodating the coils C14 and C15, the slot S15 accommodating the coils C11 and C19, and the slot S20 accommodating the coils C12 and C20 are formed in intermediate shapes of the slots S11 and S16 and the slots S14 and S19, respectively. Therefore, each of the coils C13 to C18 can be efficiently accommodated. Thus, in this armature core 51, the lamination factor of the coils C11 to C20 wound around the slots S11 to S20, that is, a ratio of occupancy of the winding amount of coils to the accommodation space of the slots can be enhanced, thereby increasing the winding amount of the coils C11 to C20 wound around the slots S11 to S20 to improve the efficiency of the electric motor 12.

As such, in the electric motor 12, since the armature core 51 has the slots S11 to S20 of the plurality of types different in shape, even if these slots S11 to S20 are tilted in the rotating direction with respect to the axial direction of the rotating shaft 52, it is possible to improve the lamination factor of the coils C1 to C10 to enhance the efficiency of the electric motor 12.

In the electric motor 12, the slot S19 accommodating the last coil C19 is formed so that the circumferential-directional width on a side opposite to the slot S20 with respect to the slot position reference line L is large on the opening side. Therefore, the length of the engaging portion 55 of the teeth T18 on which the coil C19 is caught is long. Also, the slot S15 accommodating the other side of the coil C19 is formed so that the circumferential-directional width on the opening side of the slot S16 is large. Therefore, the length of the engaging portion 55 of the teeth T15 on which the coil C19 is caught is long. Thus, the coil C20 can be reliably held between the teeth T15 and T18.

Similarly, the slot S14 accommodating the last coil C20 is formed so that the circumferential-direction width on a side opposite to the slot S15 with respect to the slot position reference line L is large on the opening side. Therefore, the length of the engaging portion 55 of the teeth T13 on which the coil C20 is caught is long. Also, the other side of the coil C20 is accommodated in the slot S20, but the slot S20 is formed so that the circumferential-directional width on the opening side of the slot S11 with respect to the slot position reference line L is large. Therefore, the length of the engaging portion 55 of the teeth T20 on which the coil C20 is caught is long. Thus, the coil C20 can be reliably held between the teeth T13 and T20.

As such, in the armature core 51, the last coils C19 and C20 can be reliably held in the armature core 51.

Figure 6A:
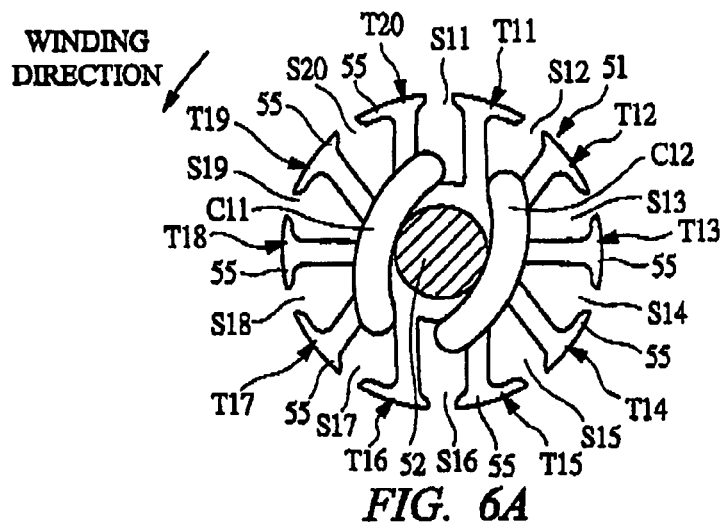
FIGS. 6A to 6C are section views showing the case where a winding direction of the coils in FIGS. 5A to 5C is reversed, respectively.
Figure 6B:
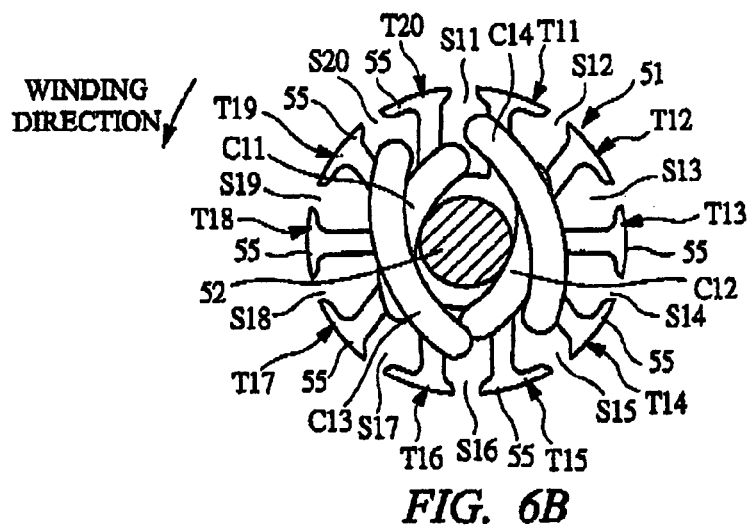
Figure 6C:
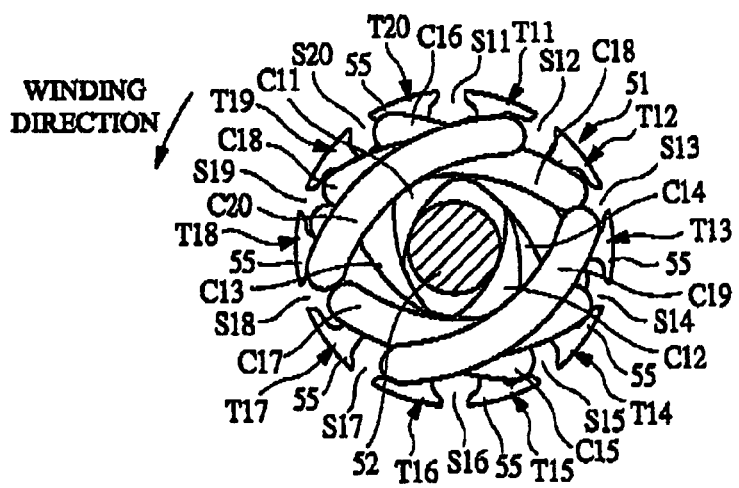

FIGS. 6A to 6C are section views showing the case where the winding direction of the coils in FIGS. 5A to 5C is reversed.

Meanwhile, since the armature core 51 is formed to have line symmetry with respect to the slot position reference line L of the slots S11 and S16 set as a reference, even if the winding direction of the double lap winding of coils is a counterclockwise direction that is reversed to the case shown in FIG. 5, the last coils C19 and C20 can be reliably held in the slots, as shown in FIGS. 6A to 6C.

That is, as shown in FIGS. 6A to 6C, in the case where the winding direction of each of the coils C11 to C20 is made in a direction reversed to the case shown in FIGS. 5A to 5C, the coils C19 and C20 are accommodated in the slots S13 and S18, respectively, which are disposed so as to have line symmetry with respect to the slots S14 and S19 by setting the slot position reference line L of the slots S11 and S16 as a reference and which have the same shape. Therefore, the coil C19 is spread across the teeth T13 and T16, whilst the coil C20 is spread across the teeth T11 and T18. The engaging portion 55 on each side on which these teeth T11, T13, T16, and T18 are spread across is formed long, so that these coils C19 and C20 can be reliably held in the armature core 51 in a manner similar to the case shown in FIGS. 5A to 5C.

As such, in the electric motor 12, the armature core 51 is formed to have line symmetry with respect to the slot position reference line L of the slots S11 and S16 set as a reference, so that the last coils C19 and C20 can be engaged in the engaging portions 55 which are formed long even if the winding directions of the coils S11 to S20 are in either direction. Thus, the coils C19 and C20 can be reliably held in the armature core 51.

Also, in the process of winding the coils around the armature core 51, there is no need to specify the winding directions of the coils C11 to C20 or a setting direction of the armature core 51 to an unshown winding machine, thereby making it possible to wind easily the coils C11 to C20 around the armature core 51.

The present invention is not limited to the above-described embodiments and, needless to say, can be variously changed without the scope of not departing from the gist of the invention. For example, in the above-described embodiments, there has been described the case where the electric motor 12 according to the present invention is exemplarily applied to the regulator motor 11 for opening and closing the door glass of the vehicle. However, the present invention is not limited to this, and may be used for driving another driven member, such as a wiper motor for driving a rear wiper provided to the vehicle, for example. Also in such a case, the driven member can be smoothly operated. Also, by downsizing the electric motor 12, its mountability and installation characteristic can be improved.

Figure 7:
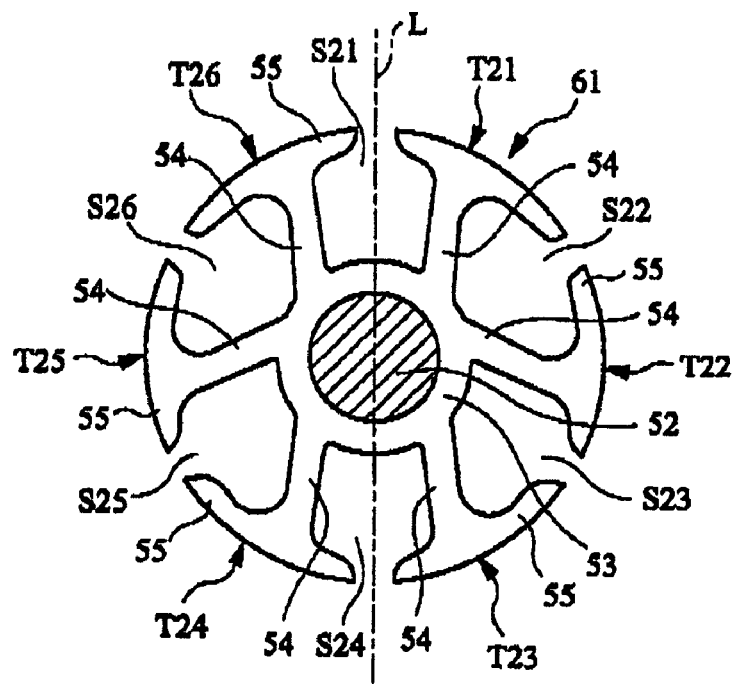
FIG. 7 is a section view showing another embodiment of the present invention.
Figure 8:
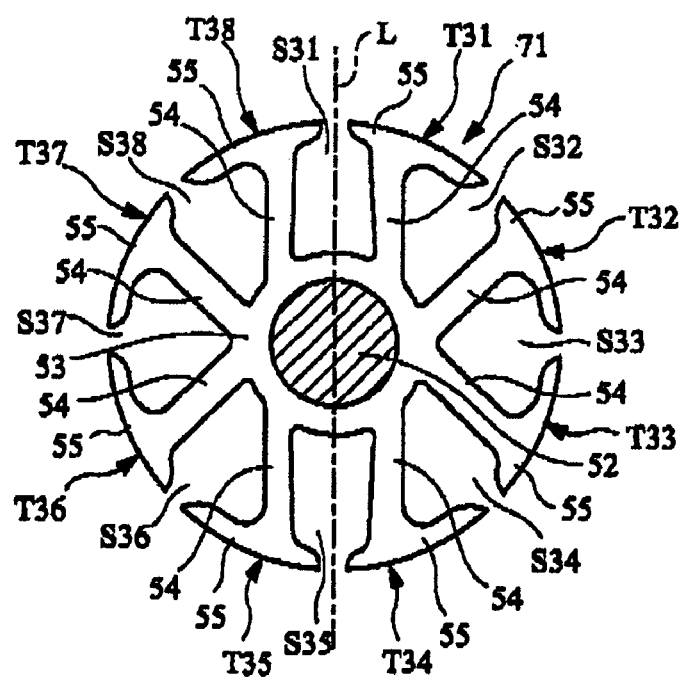
FIG. 8 is a section view showing another embodiment of the present invention.

Also, in the above-described embodiments, the armature core 17 includes ten slots S1 to S10 of four types different in shape. However, the present invention is not limited to this, and may be provided with slots of at least two types different in shape. For example, as shown in FIG. 7, an armature core 61 having six slots S21 to S26 formed among teeth T21 to T26 may be provided. In this case, the armature core 61 is formed to have line symmetry with respect to a slot reference line L of slots S21 and S24 set as a reference. Also, for example, as shown in FIG. 8, an armature core 71 having eight slots S31 to S38 formed among teeth T31 to T38 may be provided. In this case, the armature core 71 is formed to have line symmetry with respect to a slot reference line L of slots S31 and S35 set as a reference. Note that, in FIGS. 7 and 8, members corresponding to those described above are denoted by the same reference numerals.

Furthermore, in the above-described embodiments, the worm gear mechanism is used as the decelerating mechanism 26. However, the present invention is not limited to this, and may use another decelerating mechanism such as a combination of spur gears different in the numbers of teeth, Furthermore, technical ideas (invention) other than those according to the present invention that can be derived from the above embodiments will be described below.

An electric motor according to the invention converts electric energy to mechanical energy via magnetic energy and comprises: a rotating shaft rotatably supported in a motor housing; a boss portion fixed to the rotating shaft; an armature core provided with a plurality of teeth each including a base portion protruding from the boss portion and an engaging portion extending to both sides in a circumferential direction; magnets fixed to an inner surface of the motor housing so as to face the armature core; and a plurality of coils wound between a pair of teeth, between which the predetermined number of teeth is spaced, and accommodated in slots formed among the teeth, wherein a circumferential-directional width on a bottom side and a circumferential-directional width on an opening side are approximately the same and are formed so as to be approximately symmetric with respect to a slot position reference line, the slots are formed by a pair of first slots disposed to have point symmetry with respect to the rotating shaft set as a center and by at least two pairs of second slots disposed on both sides of one of the first slots and the other of the first slots so that a circumferential-directional width on a first slot side with respect to the slot position reference line is narrower than the first slot on a bottom side and is larger than the first slot on an opening side, and the armature core is formed so as to have line symmetry with respect to the slot position reference line of the first slots set as a reference.

In the electric motor according to the present invention, circumferential-directional widths of the base portions of the teeth are approximately the same, and circumferential-directional widths of the engaging portions of the teeth are approximately the same.

INDUSTRIAL APPLICABILITY

The present invention can be applied in manufacturing an electric motor with good efficiency and less torque ripple.

The invention claimed is:

1. An electric motor comprising:
a motor housing;
a pair of magnets fixed on an inner surface of the motor housing;
a rotating shaft rotatably supported at the motor housing;
an armature core fixed to the rotating shaft and arranged between the pair of magnets; and
a coil wound around the armature core,
wherein the armature core includes a boss portion fixed to the rotating shaft and ten teeth projecting from the boss portion,
wherein the ten teeth comprise:
a first teeth group including first, second, and third teeth adjacent to one another and all tilted in a circumferential direction of the rotating shaft;
a second teeth group including fourth and fifth teeth adjacent to each other and titled in a direction opposite to the tilted direction of the first teeth group, the second teeth group being adjacent to one of a first side and a second side of the first teeth group;
a third teeth group including ninth and tenth teeth adjacent to each other and tilted in the direction opposite to the tilted direction of the first teeth group, the third teeth group being adjacent to the other one of the first side and the second side of the first teeth group; and
a fourth teeth group including sixth, seventh, and eighth teeth tilted in the same circumferential direction as that of the first, second, and third teeth of the first teeth group and arranged so as to have point symmetry with the rotating shaft, and
wherein the coil comprises:
a first coil portion wound through a first slot located between the first and tenth teeth and a fifth slot located between the fourth and fifth teeth;
a second coil portion opposite to the first coil portion and wound around a tenth slot located between the ninth and tenth teeth and a sixth slot located between the fifth and sixth teeth;
a third coil portion provided outside the first coil portion and wound around a second slot located between the first and second teeth and the sixth slot located between the fifth and sixth teeth;
a fourth coil portion provided outside the second coil portion, opposite to the third coil portion, and wound around the first slot located between the first and tenth teeth and a seventh slot located between the sixth and seventh teeth;
a fifth coil portion provided outside the third coil portion and wound around a third slot located between the second and third teeth and the seventh slot located between the sixth and seventh teeth;
a sixth coil portion provided outside the fourth coil portion, opposite to the fifth coil portion, and wound around the second slot located between the first and second teeth and an eighth slot located between the seventh and eighth teeth;
a seventh coil portion provided outside the fifth coil portion and wound around a fourth slot located between the third and fourth teeth and the eighth slot located between the seventh and eighth teeth;
an eighth coil portion provided outside the sixth coil portion, opposite to the seventh coil portion, and wound around the third slot located between the second and third teeth and a ninth slot located between the eighth and ninth teeth;
a ninth coil portion provided outside the seventh coil portion and wound around the fifth slot located between the fourth and fifth teeth and the ninth slot located between the eighth and ninth teeth; and
a tenth coil portion provided outside the eighth coil portion, opposite to the ninth coil portion, and wound around the fourth slot located between the third and fourth teeth and the tenth slot located between the ninth and tenth teeth.

2. The electric motor according to claim 1, wherein the first, second, third, sixth, seventh, and eighth teeth are tilted in a counterclockwise direction, and the fourth, fifth, ninth, and tenth teeth are tilted in a clockwise direction and formed on the boss portion, said clockwise direction corresponding to a winding direction of the coil.

3. The electric motor according to claim 1, wherein:
each of the ten teeth includes an engaging portion having a width;
the widths of the engaging portions of the teeth are equal; and
the engaging portions of the teeth are equally spaced.

4. The electric motor according to claim 1, wherein:
the first, second, third, sixth, seventh, and eighth teeth are tilted in a counterclockwise direction, and the fourth, fifth, ninth, and tenth teeth are tilted in a clockwise direction and formed on the boss portion, said clockwise direction corresponding to a winding direction of the coil; and
each of the ten teeth includes an engaging portion having a width, the widths of the engaging portions of the teeth are equal, and the engaging portions of the teeth are equally spaced.

5. The electric motor according to claim 1, wherein respective sets of the first coil portion and second coil portion, the third coil portion and fourth coil portion, the fifth coil portion and sixth coil portion, the seventh coil portion and eighth coil portion, and the ninth coil portion and tenth coil portion are wound simultaneously around the armature core by a double flier scheme.

6. The electric motor according to claim 1, wherein the armature core is skewed axially.

7. An electric motor comprising:
a motor housing;
a pair of magnets fixed on an inner surface of the motor housing;
a rotating shaft rotatably supported on the motor housing;
an armature core fixed to the rotating shaft and arranged between the pair of magnets; and
a coil wound around the armature core,
wherein the armature core comprises a cylindrical boss portion fixed to the rotating shaft and first through tenth teeth projecting from the boss portion and arranged in a circumferential direction, each of the teeth being tilted with respect to the boss portion and arranged non-radially with respect to a center of the boss portion, said teeth having point symmetry,
wherein respective pairs of the first and tenth teeth, the second and ninth teeth, the fourth and seventh teeth, and the fifth and sixth teeth are each arranged so as to have line symmetry with a predetermined first reference line passing through the center of the boss portion, and the third and eighth teeth are positioned so as to have point symmetry with the center of the boss portion,
wherein respective pairs of the third and tenth teeth and the fifth and eighth teeth are each arranged so as to have the line symmetry with a second reference line passing through the center of the boss portion, said second reference line being about 36 degrees away from the first reference line in a clockwise direction, said clockwise direction corresponding to a winding direction of the coil,
wherein respective pairs of the first and fourth teeth and the sixth and ninth teeth are each arranged so as to have line symmetry with a third reference line passing through the center of the boss portion, said third reference line being about 72 degrees away from the predetermined first reference line in the clockwise direction, and
wherein respective pairs of the second and fifth teeth, the third and fourth teeth, the seventh and tenth teeth, and the eighth and ninth teeth are each arranged so as to have the line symmetry with a fourth reference line passing through the center of the boss portion, which is about 108 degrees away from the predetermined first reference line in the clockwise direction.

8. The electric motor according to claim 7, wherein the first, second, third, sixth, seventh, and eighth teeth are tilted in a counterclockwise direction, and the fourth, fifth, ninth, and tenth teeth are tilted in the clockwise direction and formed on the boss portion.

9. The electric motor according to claim 7, wherein:
each of the ten teeth includes an engaging portion having a width;
the widths of the engaging portions of the teeth are equal; and
the engaging portions of the teeth are equally spaced.

10. The electric motor according to claim 7, wherein:
the first, second, third, sixth, seventh, and eighth teeth are tilted in a counterclockwise direction, and the fourth, fifth, ninth, and tenth teeth are tilted in the clockwise direction and formed on the boss portion; and
each of the ten teeth includes an engaging portion having a width, the widths of the engaging portions of the teeth are equal, and the engaging portions of the teeth are equally spaced.

11. An electric motor comprising:
a motor housing;
a pair of magnets fixed on an inner surface of the motor housing;
a rotating shaft rotatably supported on the motor housing;
an armature core fixed to the rotating shaft and arranged between the pair of magnets; and
a coil wound around the armature core,
wherein the armature core includes a cylindrical boss portion fixed to the rotating shaft and first through tenth teeth projecting from the boss portion and arranged in a circumferential direction, each of the teeth being tilted with respect to the boss portion and arranged non-radially with respect to a center of the boss portion,
wherein respective pairs of the first and tenth teeth, the second and ninth teeth, the fourth and seventh teeth, and the fifth and sixth teeth are each arranged so as to have line symmetry with a predetermined first reference line passing through the center of the boss portion, and the third and eighth teeth are positioned to have point symmetry with the center of the boss portion, and
wherein the coil comprises:
a first coil portion wound through a first slot located between the first and tenth teeth and a fifth slot located between the fourth and fifth teeth;
a second coil portion opposite to the first coil portion and wound around a tenth slot located between the ninth and tenth teeth and a sixth slot located between the fifth and sixth teeth;
a third coil portion provided outside the first coil portion and wound around a second slot located between the first and second teeth and the sixth slot located between the fifth and sixth teeth;
a fourth coil portion provided outside the second coil portion, opposite to the third coil portion, and wound around the first slot located between the first and tenth teeth and a seventh slot located between the sixth and seventh teeth;
a fifth coil portion provided outside the third coil portion and wound around a third slot located between the second and third teeth and the seventh slot located between the sixth and seventh teeth;
a sixth coil portion provided outside the fourth coil portion, opposite to the fifth coil portion, and wound around the second slot located between the first and second teeth and an eighth slot located between the seventh and eighth teeth;
a seventh coil portion provided outside the fifth coil portion and wound around a fourth slot located between the third and fourth teeth and the eighth slot located between the seventh and eighth teeth;
an eighth coil portion provided outside the sixth coil portion, opposite to the seventh coil portion, and wound around the third slot located between the second and third teeth and a ninth slot located between the eighth and ninth teeth;
a ninth coil portion provided outside the seventh coil portion and wound around the fifth slot located between the fourth and fifth teeth and the ninth slot located between the eighth and ninth teeth; and
a tenth coil portion provided outside the eighth coil portion, opposite to the ninth coil portion, and wound around the fourth slot located between the third and fourth teeth and the tenth slot located between the ninth and tenth teeth.

12. The electric motor according to claim 11, wherein the first, second, third, sixth, seventh, and eighth teeth are tilted in a counterclockwise direction, and the fourth, fifth, ninth, and tenth teeth are tilted in a clockwise direction and formed on the boss portion, said clockwise direction corresponding to a winding direction of the coil.

13. The electric motor according to claim 11, wherein:
each of the ten teeth includes an engaging portion having a width;
the widths of the engaging portions of the teeth are equal; and
the engaging portions of the teeth are equally spaced.

14. The electric motor according to claim 11, wherein:
the first, second, third, sixth, seventh, and eighth teeth are tilted in a counterclockwise direction, and the fourth, fifth, ninth, and tenth teeth are tilted in a clockwise direction and formed on the boss portion, said clockwise direction corresponding to a winding direction of the coil; and
each of the ten teeth includes an engaging portion having a width, the widths of the engaging portions of the teeth are equal, and the engaging portions of the teeth are equally spaced.

15. The electric motor according to claim 11, wherein respective sets of the first coil portion and second coil portion, the third coil portion and fourth coil portion, the fifth coil portion and sixth coil portion, the seventh coil portion and eighth coil portion, and the ninth coil portion and tenth coil portion are wound simultaneously around the armature core by a double flier scheme.

16. The electric motor according to claim 11, wherein the armature core is skewed axially.

* * * * *